(12) United States Patent
Brandt et al.

(10) Patent No.: US 8,141,134 B2
(45) Date of Patent: Mar. 20, 2012

(54) AUTHENTICATION ENGINE FOR ENROLLMENT INTO A COMPUTER ENVIRONMENT

(75) Inventors: Jessica Lynn Brandt, Charlotte, NC (US); William Larry Grant, Jr., Charlotte, NC (US); Linda Marie Dziedzic, Puyallup, WA (US); Aaron Daniel Lewis, Issaquah, WA (US); Duncan Converse Morrell, Mercer Island, WA (US); Kapil Pruthi, Redmond, WA (US); Nishant H. Shah, Fremont, CA (US); Justin McCord, Weddington, NC (US); Heather Dolan, Mcadenville, NC (US); Ronald C. Mitchell, Jr., Waxhaw, NC (US); Michael Dean Bridges, Trophy Club, TX (US); Craig T. Johnson, Seattle, WA (US); Xianhong Zhang, Issaquah, WA (US); Tanuja Melkani, Bellevue, WA (US); Debra Jean Lewis, Snoqualmie, WA (US); Gail R. Davis, Yuma, AZ (US); Karen Choy, San Francisco, CA (US); David Shroyer, Matthews, NC (US); Joseph M. Hollmann, Dallas, TX (US); Kris Tullos, Charlotte, NC (US); Sidney A. Winchester, Jr., Belmont, NC (US)

(73) Assignee: Bank of America Corporation, Charlotte, NC (US)

( * ) Notice: Subject to any disclaimer, the term of this patent is extended or adjusted under 35 U.S.C. 154(b) by 397 days.

(21) Appl. No.: 12/609,659

(22) Filed: Oct. 30, 2009

(65) Prior Publication Data

US 2010/0313245 A1    Dec. 9, 2010

Related U.S. Application Data

(60) Provisional application No. 61/185,060, filed on Jun. 8, 2009.

(51) Int. Cl.
*G06F 15/16* (2006.01)
*H04L 29/06* (2006.01)
*G06F 21/00* (2006.01)

(52) U.S. Cl. .............................. 726/4; 713/155; 705/70

(58) Field of Classification Search ........ 726/4; 705/70; 713/155
See application file for complete search history.

(56) References Cited

U.S. PATENT DOCUMENTS

| 2011/0099608 A1* | 4/2011 | Queck et al. ............. 726/4 |
| 2011/0197060 A1* | 8/2011 | Mukherjee ............. 713/155 |

* cited by examiner

*Primary Examiner* — Philip Chea
(74) *Attorney, Agent, or Firm* — Michael A. Springs; Moore & Van Allen PLLC; Nicholas C. Russell

(57) ABSTRACT

Embodiments of the invention are generally directed to a system and method for enrolling a user into an authentication system. In some embodiments of the invention, a user completes a first portion of the enrollment or setup process using a first computer environment, but is not permitted to complete the enrollment or setup process from the first computer environment. The system permits the user to complete the enrollment or setup process only from a second computer environment different from the first computer environment. In one embodiment, the second computer environment is any computer environment outside of the first computer environment.

30 Claims, 9 Drawing Sheets

AUTHENTICATION ENGINE FOR ENROLLMENT INTO A COMPUTER ENVIRONMENT

CROSS REFERENCE TO RELATED APPLICATIONS

This application claims benefit of priority under 35 U.S.C. §119(e) to the filing date of U.S. Provisional Application No. 61/185,060, as filed on Jun. 8, 2009, which is incorporated herein by reference in its entirety.

FIELD

In general, embodiments of the present invention relate to apparatuses and methods for enrolling and/or authenticating a person into a computer environment.

BACKGROUND

Computer environments, such as, for example, online banking environments and other online environments, allow customers to conveniently and remotely handle certain tasks without having to visit a particular physical location. For example, banking matters that previously would have required a customer to visit an automated teller machine (ATM), a bank branch location, or the like, can often be handled online through an online banking system. While online and other computer environments offer great benefits of convenience to the customer, security can sometimes be an issue since the system must determine whether the customer is the person he or she is claiming to be. As a result, online and other computer environments often have elaborate authentication systems to verify that the customer trying to access and use the environment is authorized to do so. For example, an authentication system may require that a customer create a unique username or other identifier, a password, personal identification number (PIN), or other passcode, a SiteKey™ or other image-based site authenticator, one or more security questions and/or answers, and/or the like (herein referred to generally as "authenticators"). These authentication systems then require that the customer present or respond to one or more of these authenticators whenever the customer attempts to access and/or use the computer environment.

However, many conventional enrollment processes for enrolling into an authentication system and establishing these authenticators have inherent problems. For example, customers are generally provided with all of the necessary authentication information, such as unique customer identifiers/usernames and/or passcodes/passwords, at the time of initial enrollment, thus making the information susceptible to be lost, misplaced, or taken and used by someone other than the owner.

Also, a customer often is asked to review forms, disclosures, contracts, agreements, etc., that may require his or her consent. These documents are normally lost in massive amounts of paperwork and customers generally do not recall the content contained therein or, sometimes, consenting to them at all.

BRIEF SUMMARY OF EMBODIMENTS OF THE INVENTION

Accordingly, described herein are various apparatuses and methods for enrolling persons, such as customers, in an online or other computer environment and an associated authentication system. The apparatuses and methods described hereinafter provide increased security to the process of enrolling in online accounts and establishing authenticators required for accessing the online accounts. Specifically, as described herein, embodiments of the systems and methods may use, for example, temporary and permanent passcodes, authorization numbers, authentication questions, out-of-wallet questions and a website image identification security system in unique combinations and at different times during the authentication process and/or at different locations to prevent unauthorized users from gaining access to all of the online log-in credentials at once. In some embodiments, log-in or access locations, IP addresses, cookies, and/or the like, may be identified and the systems and methods described hereinafter may prevent users from performing certain portions of the enrollment or setup process from certain locations. Embodiments of the apparatuses and methods described hereinafter may reduce the occurrences of unauthorized access to customer accounts online by persons other than the customer.

More particularly, some embodiments of the present invention provide an apparatus having a communication interface, a memory, and a processor operatively coupled together. The communication interface is configured to receive a request from a computer terminal to continue an enrollment or setup process. The memory has information stored therein defining a computer environment. The processor is configured to determine whether the computer terminal is within the computer environment and then permit or deny the request from the computer terminal to continue the enrollment or setup process based at least partially on whether the computer terminal is within the computer environment. In some embodiments of the apparatus, the processor is configured to deny the request to continue the enrollment process if the computer terminal is within the computer environment.

In some embodiments of the apparatus, the information stored in the memory includes a list of identifiers, such as Internet Protocol (IP) addresses. In some such embodiments, the communication interface is configured to receive an identifier from the computer terminal, and the processor is configured to determine whether the computer terminal is within the computer environment by comparing the identifier received from the computer terminal to the list of identifiers stored in the memory.

In some embodiments of the apparatus, the information stored in the memory includes a list of communication channels. In some such embodiments, the processor is further configured to: determine an identity of a communication channel through which the request from the computer terminal is received; and determine whether the computer terminal is within the computer environment by comparing the identity of the communication channel to the list of communication channels stored in the memory.

In some embodiment of the apparatus, the communication interface is configured to communicate with a first computer terminal to perform a first portion of the enrollment or setup process. In some such embodiments, the first terminal exists in a first computer environment, and the information stored in the memory defining a computer environment defines the first computer environment. In some such embodiments, the processor is configured to deny the request to continue the enrollment or setup process if the computer terminal is within the first computer environment. In some such embodiments, the first portion of the enrollment or setup process includes establishing a temporary password for a user, and the request to continue the enrollment or setup process includes a request to establish a permanent password. More generally, in some embodiments the enrollment or setup process includes establishing one or more authenticators to be used to authenticate a user, where the first portion of the enrollment or setup process includes establishing a first authenticator, and the request to continue the enrollment or setup process includes a request to change the first authenticator or establish a second authenticator.

In some embodiments of the apparatus, the communication interface is configured to communicate with a first computer terminal to perform a first portion of the enrollment process, and the processor is configured to determine whether the computer terminal is within the computer environment based at least partially on a determination of whether the computer terminal is the first terminal. In some such embodiments, the processor may be further configured to deny the request to continue the enrollment or setup process if the computer terminal comprises the first computer terminal.

In some embodiments of the apparatus, the enrollment or setup process includes enrolling in an online system associated with an institution. In some such embodiments, the computer environment may include a computer system associated with the institution, and a portion of the enrollment or setup process is completed from within the computer system associated with the institution. In some such embodiments, the processor is configured to deny the request to continue the enrollment process if the computer terminal is within the computer system associated with the institution.

Embodiments of the invention further provide a method of establishing authenticators for an authentication system. In one embodiment, the method includes: (1) establishing an authenticator for a user based on communication received through a first computer environment; (2) receiving a request from a computer terminal to change the authenticator or create a new authenticator; (3) using a processor to determine if the computer terminal is within the first computer environment; and (4) hindering the request to change the authenticator or create a new authenticator if the processor determines that the computer terminal is within the first computer environment. In one embodiment, hindering the request comprises denying the request. In other embodiments, hindering the request comprises providing additional authentication hurdles to the user, such as out-of-wallet questions and/or the like.

In some embodiments of the method, the method further includes: providing a list of one or more identifiers; receiving an identifier from the computer terminal; and determining that the computer terminal is within the first computer environment if the identifier received from the computer terminal matches an identifier on the list of one or more identifiers.

In some embodiments, the method includes: providing a list of one or more communication channels; identifying a communication channel through which the request from the computer terminal is received; and determining that the computer terminal is within the first computer environment if the identified communication channel matches a communication channel on the list of one or more communication channels. In some embodiments, establishing the authenticator for the user based on communication received through the first computer environment includes establishing a temporary passcode. In some embodiments of the method, the authentication system is configured to authenticate a user accessing an online system associated with an institution, and the first computer environment includes a computer system associated with the institution.

Embodiments of the invention also provide an apparatus comprising a communication interface and a processor operatively coupled thereto, where the communication interface is configured to receive a first communication from a first computer environment and a second communication from a second computer environment. The first communication includes information used for completing a first portion of an enrollment or setup process, and the second communication includes a request to complete a second portion of the enrollment or setup process. The processor is configured to determine whether the second computer environment is different than the first computer environment. The processor is also configured to then use the communication interface to communicate with the second computer environment to complete the second portion of the enrollment or setup process if the processor determines that the second computer environment is different than the first computer environment.

Embodiments of the invention also provide an authentication system having a communication interface and a processor operatively coupled thereto. In some such embodiments, the processor is configured to: (1) use the communication interface to provide a temporary passcode; (2) receive an electronic communication comprising a request to create a permanent passcode to replace the temporary passcode; (3) verify that the electronic communication is received from a specified location; and (4) permitting creation of the permanent passcode. In one embodiment, the specified location includes any location outside of a defined computer environment. In some embodiments, the system further includes a memory having a definition of the computer environment stored therein. In some embodiments, the communication interface provides the temporary passcode using at least a portion of the defined computer environment. In some embodiments, the communication interface provides the temporary passcode to a first location, and the processor then determines that the specified location is a location different from the first location.

Embodiments of the invention also provide a method for enrollment in an authentication system. In one embodiment, the method involves: (1) receiving customer enrollment or setup information for creating an online account; (2) providing a customer identification name and temporary passcode for creating the online account; (3) receiving an electronic communication comprising a request to complete creation of an online account using the customer identification name and temporary passcode; (4) using a computer to verify that the electronic communication comprising the request is received from a specified location; and (5) providing the customer a permanent passcode for the online account.

In some embodiments of the method, the step of using the computer to verify that the request is received from the specified location involves: using the computer to determine a location of the request and then check the location against a database. In some such embodiments, the location of the request is an IP address, a telephone area code, an ATM address, a zip code, a physical address, a geocode, and/or the like.

BRIEF DESCRIPTION OF THE DRAWINGS

Figure 1:
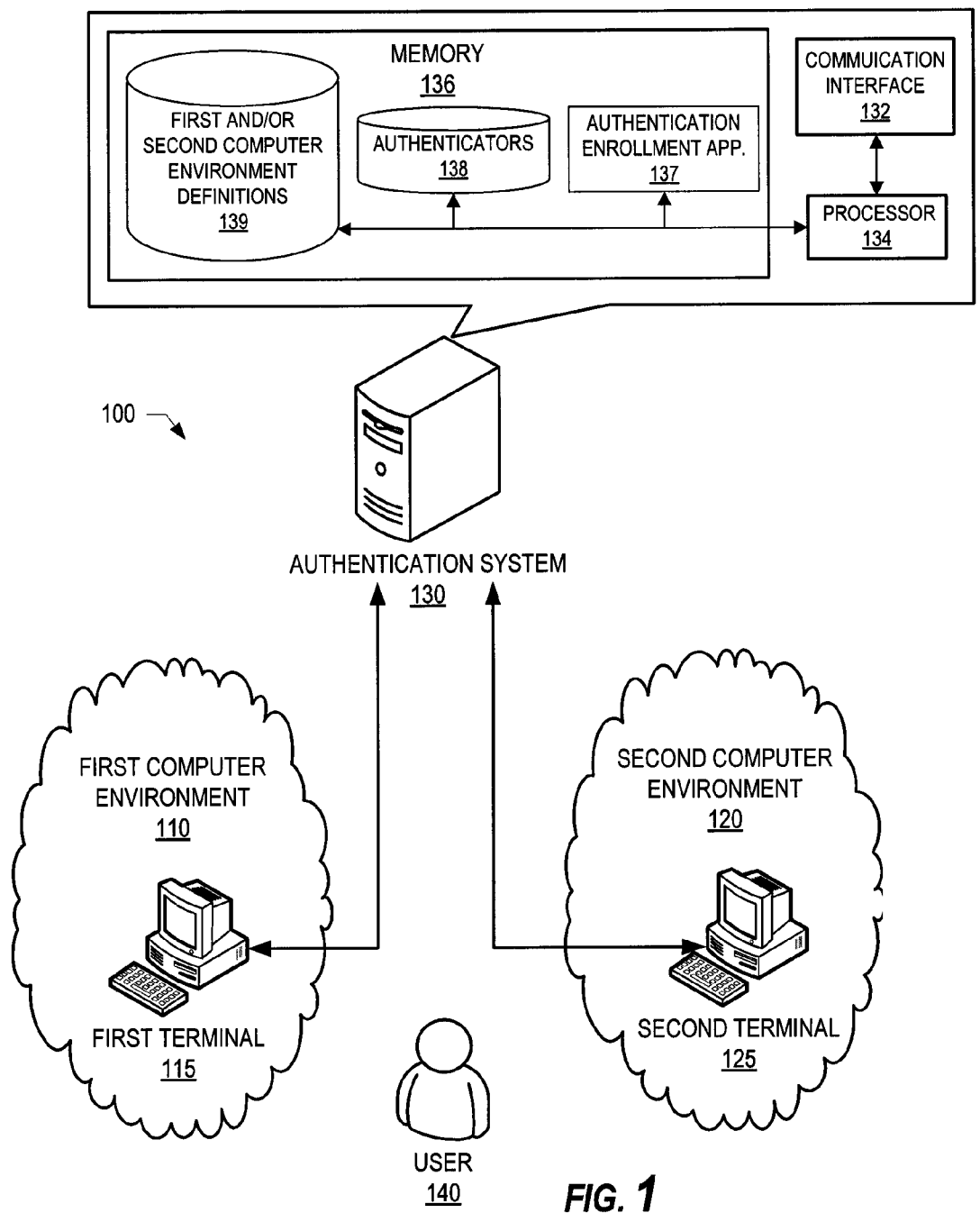
Figure 2A:
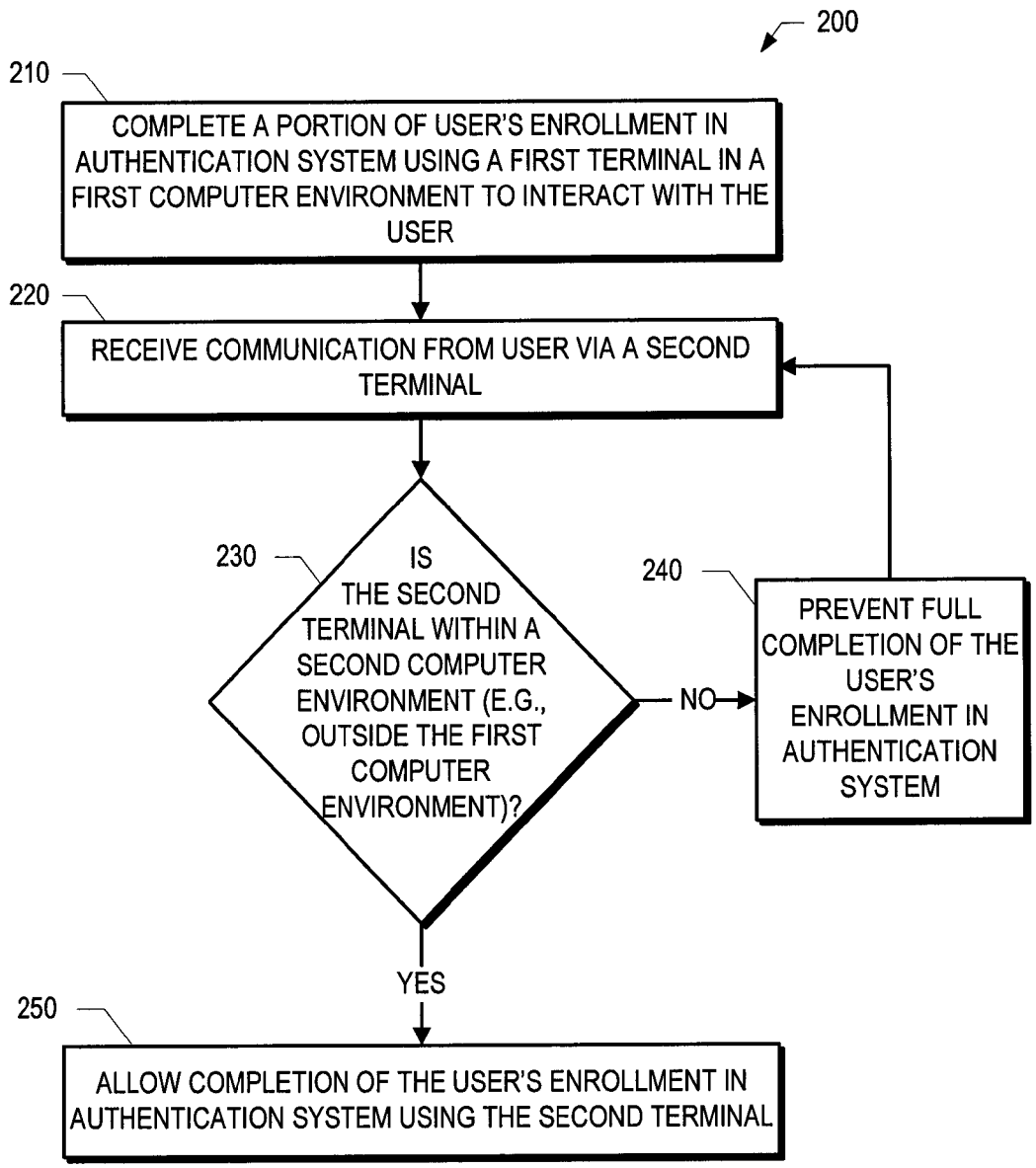
Figure 2B:
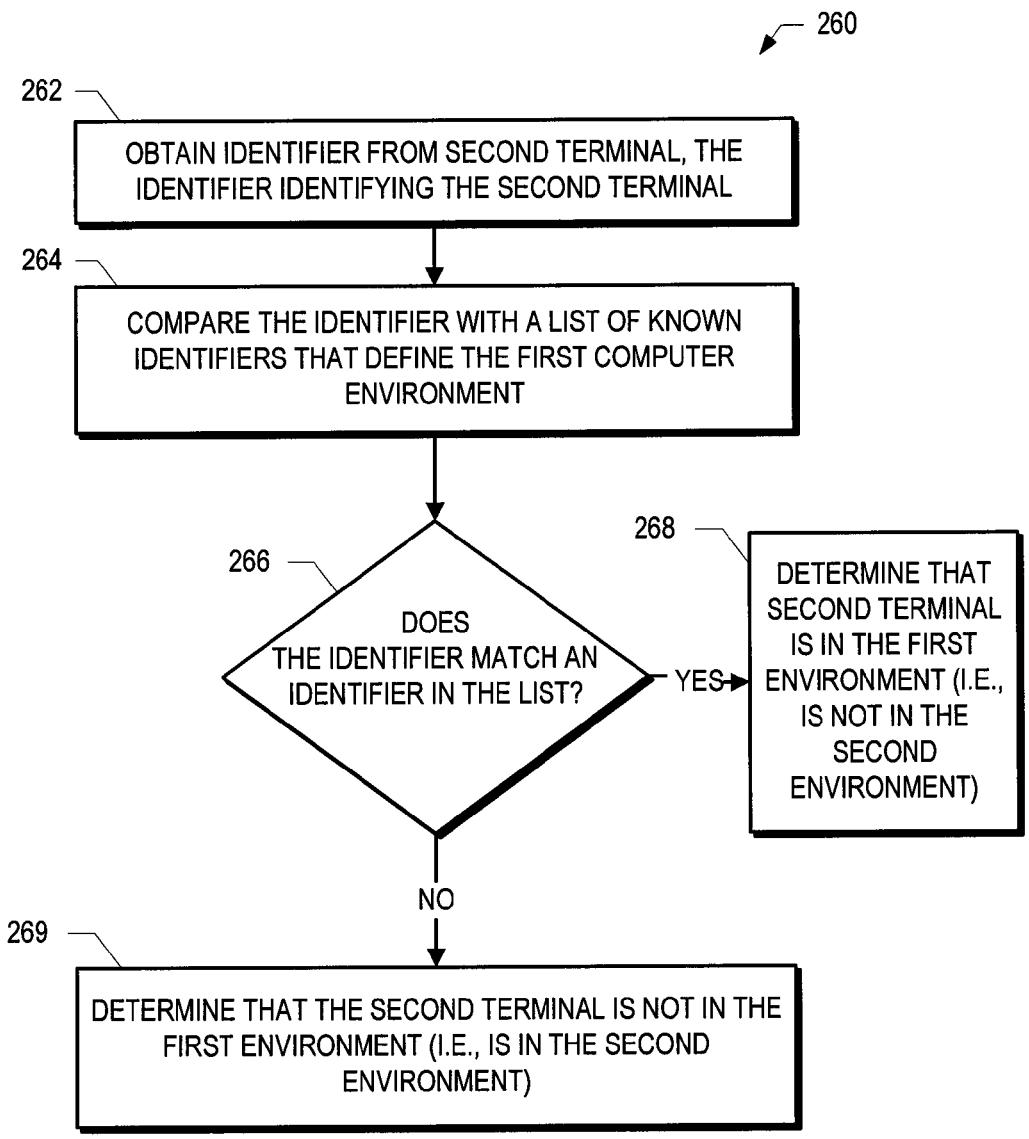
Figure 2C:
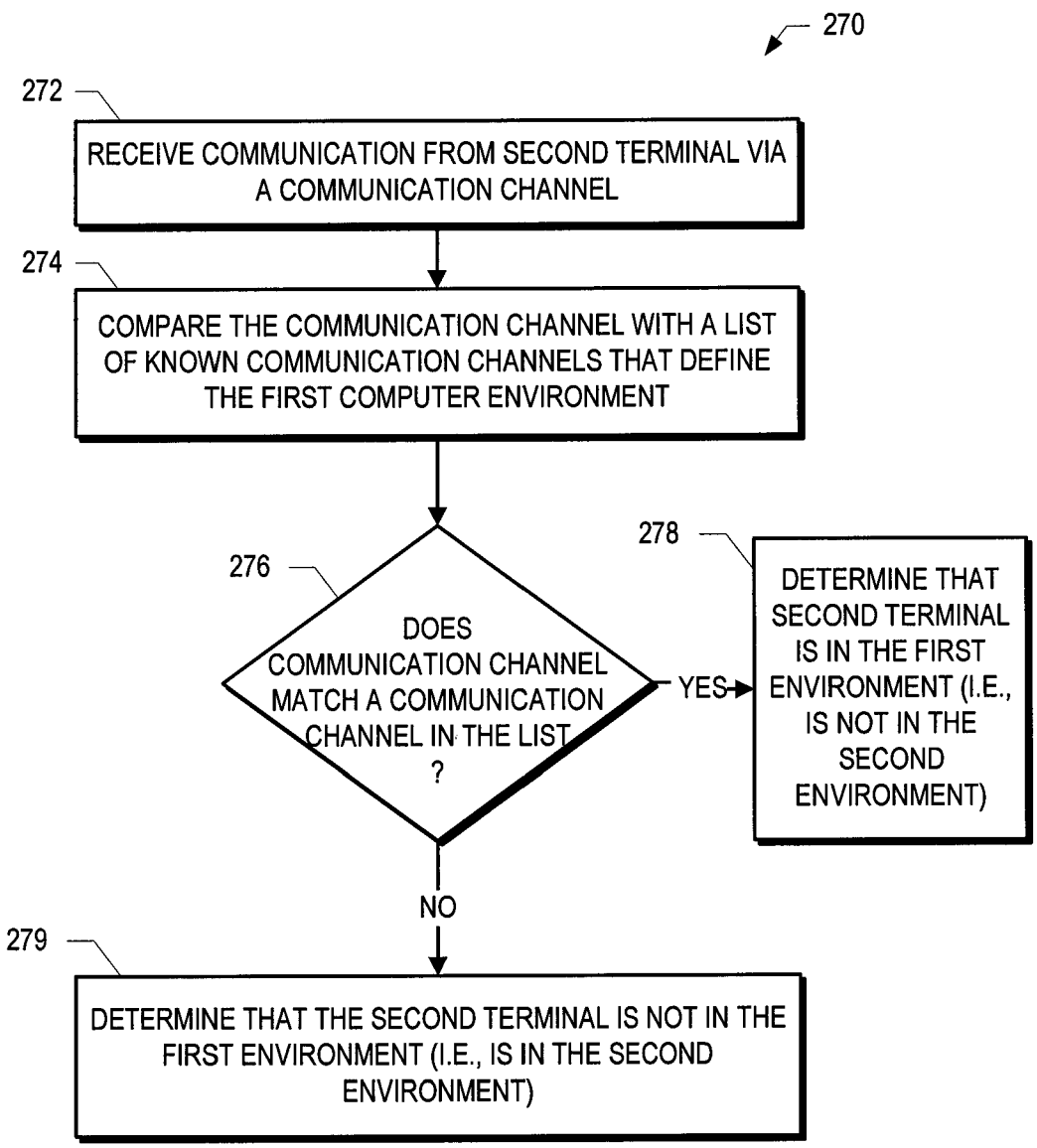
Figure 2D:
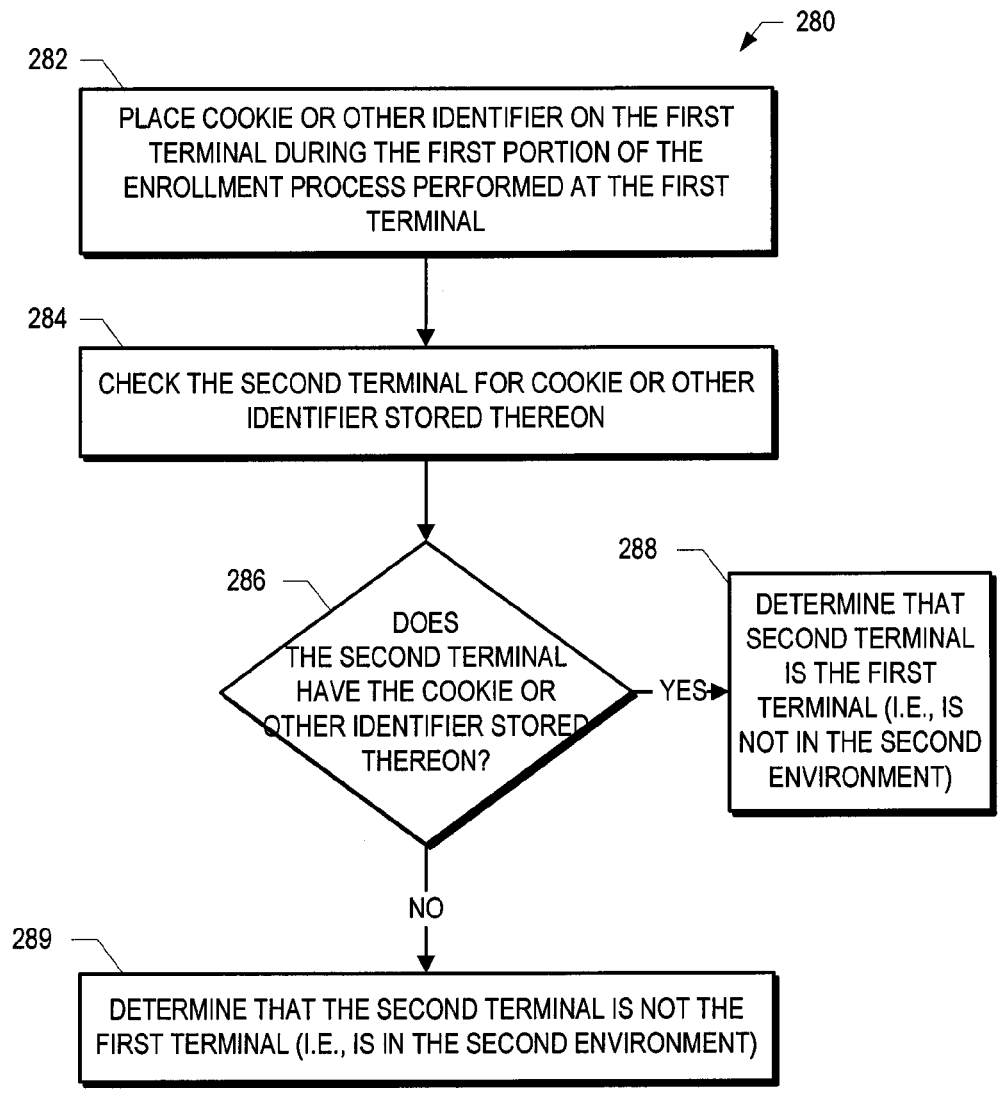
Figure 3:
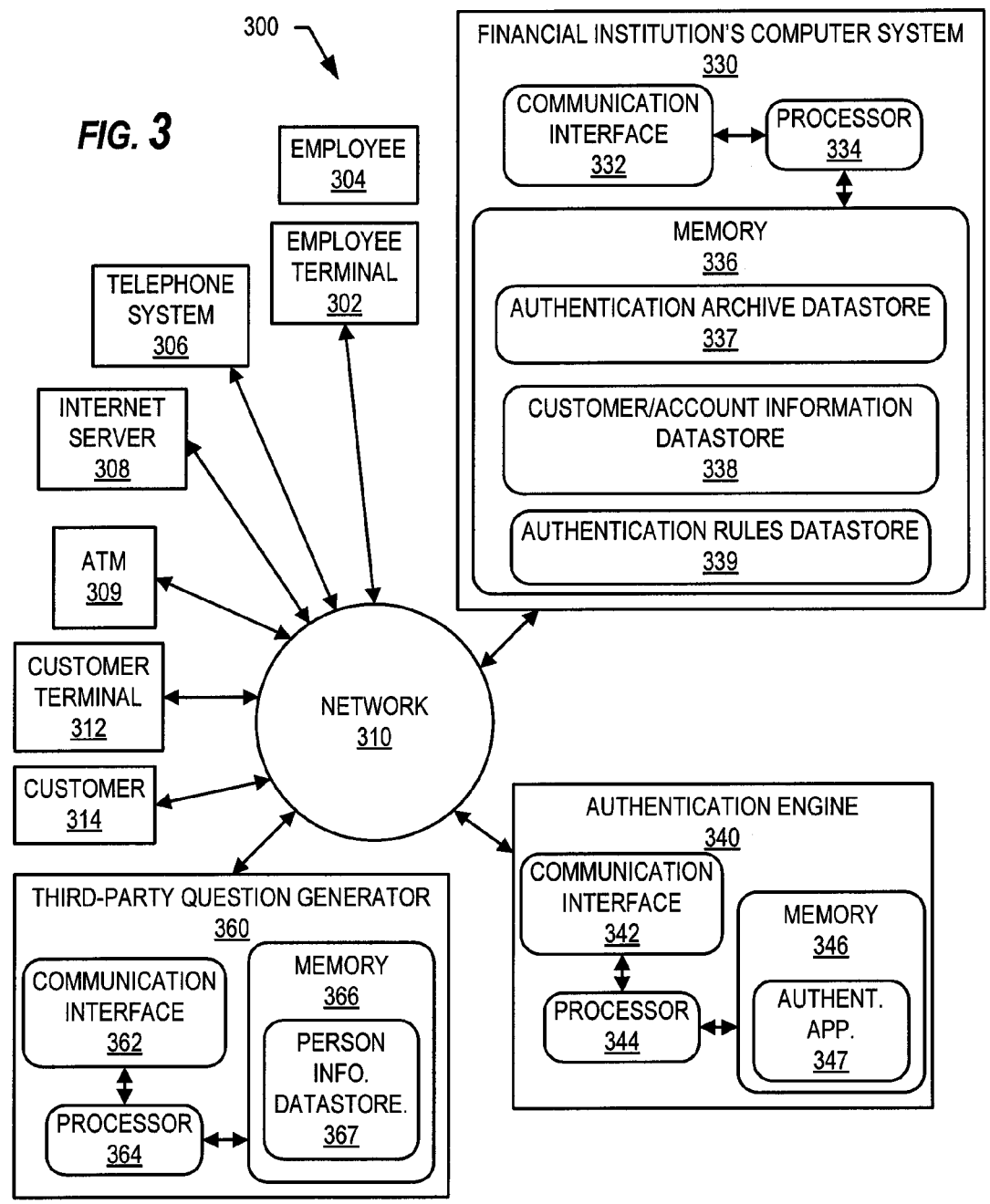
Figure 4A:
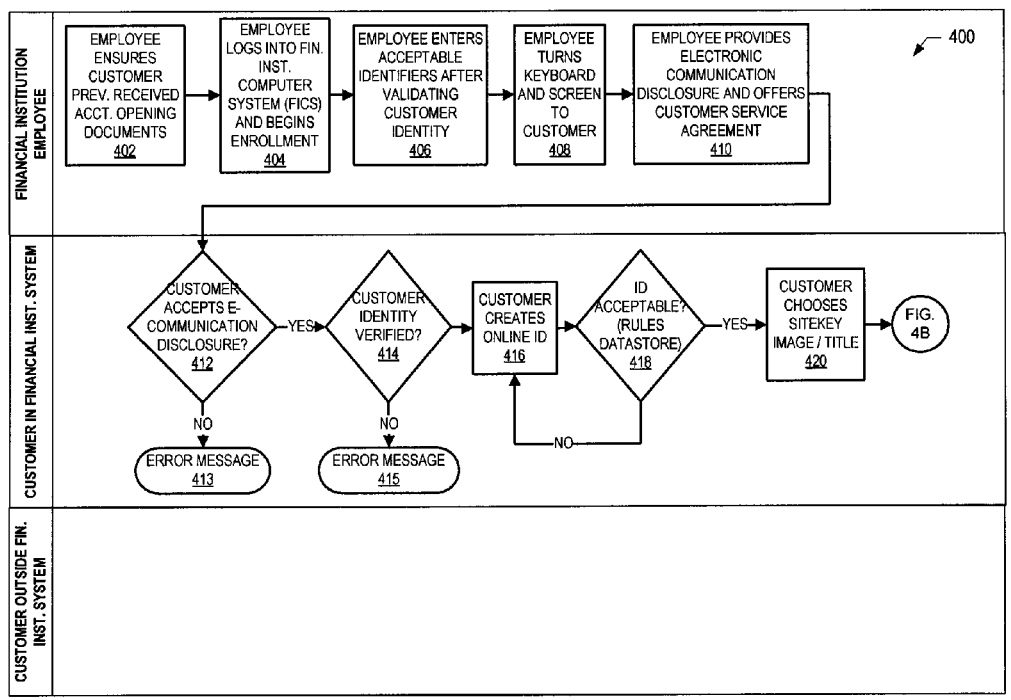
Figure 4B:
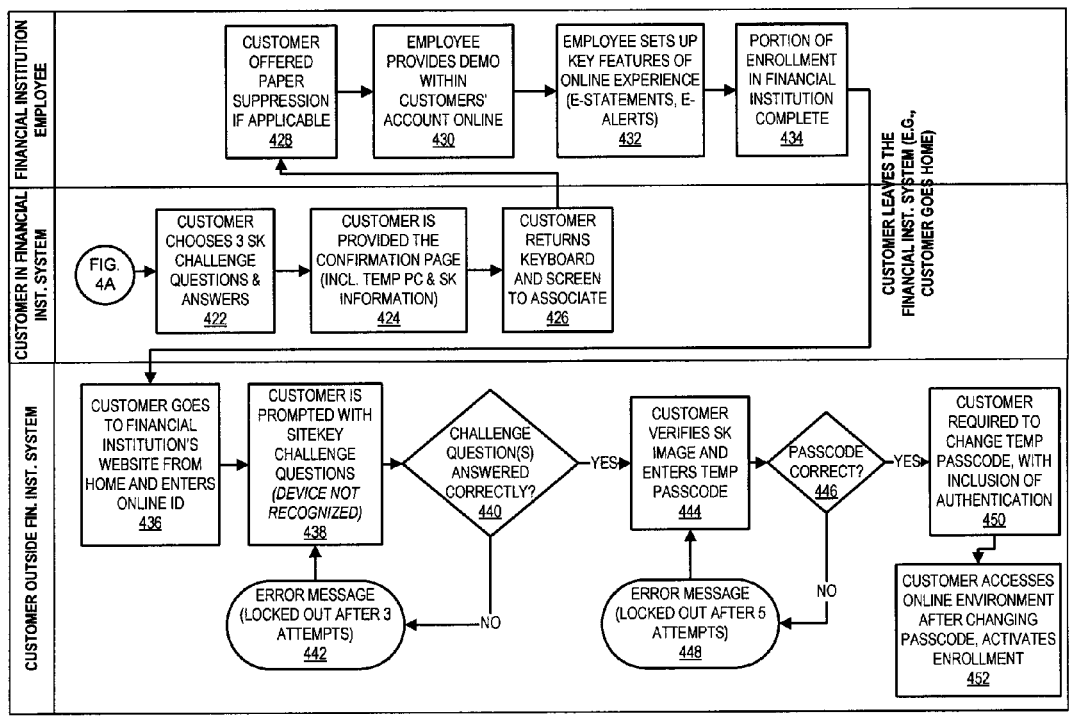
Figure 5:
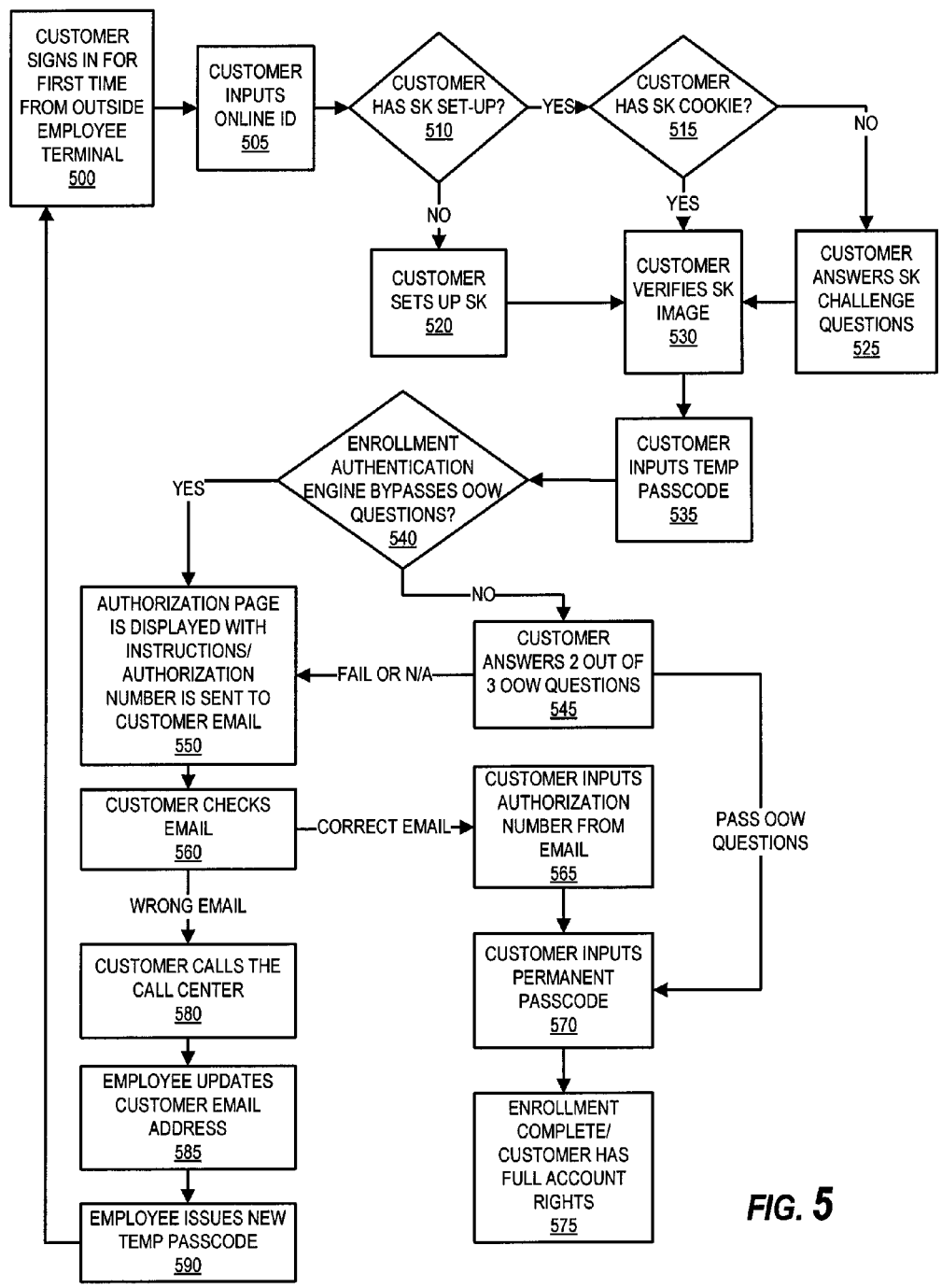

Having thus described embodiments of the present invention in general terms, reference will now be made to the accompanying drawings, wherein:

FIG. 1 is a block diagram illustrating a system and environment for enrolling a user into an authentication system in accordance with an embodiment of the present invention;

FIG. 2A is a flow diagram illustrating a process performed by the authentication system in FIG. 1 during enrollment or setup of a user into the authentication system, in accordance with an embodiment of the present invention;

FIG. 2B is a flow diagram illustrating a process that may be performed by the authentication system in FIG. 1 for determining if the second terminal is within a second computer environment, in accordance with an embodiment of the present invention;

FIG. 2C is a flow diagram illustrating another process that may be performed by the authentication system in FIG. 1 for determining if the second terminal is within a second computer environment, in accordance with an embodiment of the present invention;

FIG. 2D is a flow diagram illustrating yet another process that may be performed by the authentication system in FIG. 1 for determining if the second terminal is within a second computer environment, in accordance with an embodiment of the present invention;

FIG. 3 is a block diagram illustrating a system and environment for enrolling into an online financial system and the financial system's authentication engine, in accordance with an embodiment of the present invention;

FIG. 4A is a flow diagram illustrating a process for enrollment into the online financial system and the financial system's authentication engine, in accordance with an embodiment of the present invention;

FIG. 4B is a continuation of the flow diagram of FIG. 4A illustrating a process for enrollment into the online financial system and the financial system's authentication engine, in accordance with an embodiment of the present invention; and FIG. 5 is a flow diagram illustrating another exemplary process of completing enrollment into an online environment, in accordance with an embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; Like numbers refer to like elements throughout.

The present invention may be embodied as a method (including, for example, a business process, computer-implemented method, etc.) or apparatus (including, for example, a system, computer program product, device, etc.), or a combination of the foregoing. Accordingly, embodiments of the present invention may take the form of an entirely hardware embodiment, an entirely software embodiment (including, for example, firmware, resident software, micro-code, etc.), or an embodiment combining software and hardware aspects that may generally be referred to herein as a "system." Furthermore, embodiments of the present invention may take the form of a computer program product having a computer-readable medium having computer-executable program code (i.e., computer-readable instructions) embodied in the medium. As used herein, a processor may be "configured to" perform a certain function in a variety of ways, including, for example, by having one or more general-purpose circuits perform the function by executing specific computer-executable program code having instructions for performing the function, and/or by having one or more application-specific circuits perform the function.

Any suitable computer-readable medium may be utilized. The computer-readable medium may be, for example but not limited to, a tangible electronic, magnetic, optical, electromagnetic, infrared, or semiconductor system, apparatus, or device. More specific examples of the computer-readable medium include, but are not limited to, the following: an electrical connection having one or more wires, or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer-executable program code for carrying out operations of embodiments of the present invention may be written in an object oriented, scripted or unscripted programming language such as Java, Perl, Smalltalk, C++, or the like. However, the computer-executable program code for carrying out operations of embodiments of the present invention may also be written in conventional procedural programming languages, such as the "C" programming language or similar programming languages.

Embodiments of the present invention are described below with reference to flowchart illustrations and/or block diagrams of methods and apparatuses (systems, computer program products, devices, etc.). It will be understood that each block of the flowchart illustrations and/or block diagrams, and/or combinations of blocks in the flowchart illustrations and/or block diagrams, can be implemented by computer program instructions embodied in the computer-executable program code. The computer-executable program code may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

The computer-executable program code may be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block(s).

The computer-executable program code may also be loaded onto a computer, mobile phone, or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As described generally above, embodiments of the invention provide apparatuses and methods for authenticating and enrolling persons, such as customers, in an online or other computer environment, including enrollment in an authentication system configured to authenticate persons trying to access and/or use the online or other computer environment. The invention may use combinations of temporary and permanent passcodes, authorization numbers, authentication questions, out-of-wallet questions and a website image identification security system to accomplish this.

Some embodiments described below are described within the context of a financial institution for illustrative purposes. It is understood, however, that systems and methods of other embodiments of the present invention are not limited to financial institutions, but have applicability to other entities which may offer any type of environment in which customers may enroll and manage accounts, goods, etc., and/or carry out transactions or any environment where authentication is required and the user must establish authenticators for authentication. As such, the below embodiments are mere examples of the use of the systems and methods of embodiments of the present invention.

Referring now to the figures, FIG. 1 provides a block diagram illustrating a system and environment 100 for enrolling a user into an authentication system in accordance with an embodiment of the present invention. The environment 100 includes a first terminal 115 in a first computer environment 110, a second terminal 125 in a second computer environment, an authentication system 130, and a user 140.

The authentication system 130 is a computer system configured to authenticate the user 140. For example, the user 140 may desire to enroll in an online computer system, such as an online banking system, that requires authentication of each user before allowing a user to use the online computer system. To authenticate each user, the online computer system will generally have an authentication system 130 that is configured to perform certain authentication procedures with the user 140 and determine therefrom whether the user 140 is authorized or not authorized to use the online computer system.

For example, in some embodiments of the invention, the authentication system 130 is configured to ask the user 140 to provide one or more authenticators before the user is permitted to access and/or use the computer system. These authenticators may include, but are not limited to, a username or other identification code, a passcode (including, e.g., a password, PIN, and/or the like), an approval of a particular image or other site indicator (e.g., a SiteKey™), an answer to a security question, and/or the like. Once the authentication system 130 prompts the user 140 for an authenticator and the user 140 responds with an authenticator, the authentication system 130 compares the user's response with the authenticator 138 associated with the user 140 in the authentication system's memory 130. If the user's response matches the authenticator 138 stored in the authentication system's memory for the user 140, then the authentication system 130 authenticates the user 140. If the user's response does not match, then the authentication system 130 does not authenticate the user 140 and either prompts the user 140 to try again, locks the user 140 from the computer system, and/or takes other action.

However, before an authentication system 130 can ask a user 140 for authenticators, certain unique authenticators or combinations of authenticators have to be established for the user 140. As such, the user 140 typically first enrolls in the authentication system 130 and, during the enrollment process, creates or selects one or more authenticators that will be used to authenticate the user 140 whenever the user 140 attempts to log into the computer system in the future.

In one embodiment of the invention, the user 140 uses a first terminal 115 in a first computer environment 110 to perform a first portion of the enrollment or setup process for enrolling in the authentication system 130, and then the authentication system 130 requires that the user 140 complete or perform a second portion of the enrollment or setup process from a second terminal 125 in a second computer environment 120 outside of or otherwise different from the first computer environment 110. In this way, all of the authenticators needed for the authentication processes are not established, other than perhaps in a temporary (e.g., one-time use or other limited-time use) manner, at one time from one location.

For example, in one embodiment of the invention, the user 140 uses the first terminal 115 in the first computer environment 110 to create or select only some of a plurality of authenticators 138 needed for the user 140 to be authenticated by the authentication system 130. In some such embodiments, the user 140 is then permitted by the authentication system 130 to create or select the other authenticators 138 using only a second terminal 125 in a second computer environment 120 outside of or otherwise different from the first computer environment 110.

In another embodiment of the invention, the user 140 uses the first terminal 115 in the first computer environment 110 to select or receive one or more temporary authenticators 138. In some such embodiments, the user 140 is then permitted by the authentication system 130 to establish permanent or more-permanent authenticators 138 to replace the one or more temporary authenticators 138, but only from a second terminal 125 in a second computer environment 120 outside of or otherwise different from the first computer environment 110. As used herein, a "temporary" authenticator is one with which use thereof is limited to a relatively low number of uses or short period of time, and a "permanent" or "more-permanent" authenticator is one with which use thereof is allowed for an indefinite period of time, until the user 140 chooses to change the authenticator, and/or for a relatively large number of uses or long period of time.

In one embodiment, the first terminal 115 and/or the second terminal 125 is a desktop computer, a kiosk, or other fixed computer terminal. In other embodiments, the first terminal 115 and/or the second terminal 125 is a mobile terminal, such as a laptop computer, a handheld computer, a mobile telephone, a personal digital assistant, an email device, a gaming device, or other mobile computing device. In general, the first terminal 115 and the second terminal 125 each includes a communication interface having a network interface and a user interface. The network interface is configured to allow the terminal to communicate with the authentication system 130 and/or other devices in the computer environment in which the terminal exists. The user interface generally includes one or more user input devices, such as a keyboard, keypad, mouse, microphone, scanner, biometric device, camera, touch pad, touch screen, and/or the like, and one or more user output devices, such as a monitor, screen, or other visual output device, a speaker or other audio output device, a printer, and/or the like. Each terminal also generally includes a memory and a processor, where the processor is operatively coupled to the communication interface and the memory. The processor may include a microprocessor or other processing device configured to perform logic and communication functions of the terminal described herein.

In one embodiment of the invention, the first terminal 115 and the second terminal 125 are the same device that has been moved from within the first computer environment 110 to a second computer environment 120 outside of the first computer environment 110. In other embodiments, the authentication system 130 requires that the first terminal 115 be different from the second terminal 125. In such embodiments, the authentication system 130 may be able to determine if the devices are different based on a device identification code, a device digital signature, a cookie stored on the first terminal during the first portion of enrollment or setup, and/or the like.

The first computer environment 110 is a defined computer, computer network or other group of computers. For example, the first computer environment 110 may be defined by one or more IP (Internet Protocol) addresses, a geographic location, an intranet, an identifiable virtual network boundary, a list of device identifiers stored in the authentication system's memory 136, a particular institution's computer system, a computer account or profile, a particular local area network, a particular wireless area network, and/or the like. The first computer environment 110 may include a single computer device, such as only the first terminal 115, or instead may include a network or other plurality of computer devices. In some embodiments of the invention, the first computer environment definition 139 is stored in the memory 136 of the authentication system 130.

In one embodiment, the second computer environment 110 is defined as any computer device or environment outside of (i.e., not a member of) the first computer environment 110. In other embodiments, the second computer environment 120 is a defined computer, computer network or other group of computers different from the first computer environment 110. For example, as with the first computer environment 110, in some embodiments the second computer environment 120 may be defined by one or more IP (Internet Protocol) addresses, a geographic location, an intranet, an identifiable virtual network boundary, a list of device identifiers, a particular institution's computer system, a computer account or profile, a particular local area network, a particular wireless area network, and/or the like. The second computer environment 120 may include a single computer device, such as only the first terminal 125, or instead include a network or other plurality of computer devices. In some embodiments of the invention, the second computer environment definition 139 is stored in the memory 136 of the authentication system 130.

FIG. 2A provides a flow diagram illustrating a process 200 performed by the authentication system 130 in FIG. 1 during enrollment or setup of the user 140 into the authentication system 130, in accordance with an embodiment of the present invention. In some embodiments of the invention, the authentication system 130 includes an authentication enrollment application 137 stored in the memory 136. The authentication enrollment application 137 includes computer-executable program instructions that, when executed by the processor 134, instruct the processor 134 to perform some or all of the functions illustrated in FIGS. 2A-2D or described elsewhere herein as being performed by the authentication system 130.

As illustrated by block 210, the authentication system 130 completes a portion of a user's enrollment or setup in the authentication system 130 when the user 140 is at a first terminal 115 in a first computer environment 110. For example, as described above, this step may involve the user 140 establishing only some authenticators 138 required for authentication, with the others authenticators required for authentication not being established or being established only on a temporary basis (e.g., for one future authentication only or for some other predefined number of future authentications).

As represented by block 220, the authentication system 130 then receives a communication from the user 140 from a second terminal 125. For example, in one embodiment of the invention, the user 140 goes to another computer terminal different from the first terminal 115 or takes the first terminal 115 and goes to another computer environment and then attempts to use the new or relocated terminal to access the online computer system. When the user 140 attempts to access the online computer system, the user 140 must first be authenticated by the authentication system 130. In one embodiment of the invention, if this is the first time that the user 140 is attempting to be authenticated by the authentication system 130 after only partially completing the enrollment or setup process for the authentication system 130 in step 210, then the user 140 will be asked to complete the enrollment or setup process (e.g., by establishing any other authenticators not already established and/or by changing any temporary authenticators).

As represented by block 230, in response to the new communication from the second terminal 125, the authentication system 130 determines whether the second terminal 125 is within a second computer environment 120. As described above, in one embodiment of the invention, the rules 139 stored in the authentication system 130 define the second computer environment 120 as any computer environment outside of or otherwise different from the first computer environment 120. As such, in one embodiment of the invention, the process illustrated by block 230 involves determining whether the second terminal 125 is located outside or is otherwise different from the first computer environment 115. In other embodiments, the process involves determining whether the second terminal 125 is part of some specific predefined second computer environment 120 that is not defined in terms of the first computer environment 110.

In some embodiments of the invention, the process illustrated by block 230 involves, for example, the authentication system 130 determining whether the second terminal 125 is different from the first terminal 115. This process may be achieved by comparing IP (Internet Protocol) addresses of the two terminals, using cookies, or by any of a variety of techniques that will be apparent to one of ordinary skill in the art in view of this disclosure. In another example, the process illustrated by block 230 involves the authentication system 130 determining whether the second terminal 125 is located in a different computer network or group of computers from the first terminal 115. This process may be achieved by comparing some identifier associated with the second terminal 115 or the second terminal's network with a list of identifiers stored in the authentication system 130, or by any of a variety of other techniques that will be apparent to one of ordinary skill in the art in view of this disclosure. In another example, the process involves both determining whether the second terminal 125 is different from the first terminal 115 and whether the second terminal 125 is located outside of a network in which the first terminal 115 is located.

As represented by block 240, if the authentication system 130 determines that the second terminal 125 is not within the appropriate second computer environment 120 as defined by rules 139 stored in the authentication system 130, then the authentication system 130 will prevent the user 140 from fully completing enrollment or setup in the authentication system 130 at this time from this location. The process continues again from the step illustrated by block 220 when the authentication system 130 next receives communication from the user 140. However, as represented by block 250, if the authentication system 130 determines that the second terminal 125 is within the appropriate second computer environment 120 as defined by rules 139 stored in the authentication system 130, then the authentication system 130 will allow the user 140 to complete enrollment or setup in the authentication system 130 from this location and at this time.

FIGS. 2B, 2C, and 2D illustrate examples of how the authentication system 130 may perform the process represented by block 230 in FIG. 2A in accordance with different embodiments of the invention. For example, FIG. 2B illustrates a process 260 of determining whether the second terminal 125 is within the second computer environment 120 using terminal identifiers. FIG. 2B also illustrates an example embodiment where the second computer environment 120 is defined as anything outside of the first computer environment 110.

More particularly, as represented by block 262 in FIG. 2B, the authentication system 130 obtains an identifier from the second terminal 125, where the identifier can be used to identify the second terminal 125. For example, the identifier may be an IP (Internet Protocol) address or other unique identifier stored in or otherwise uniquely associated with the second terminal 125 and available to the authentication system's communication interface 132.

As represented by block 264, the authentication system 130 then compares the identifier with a list of known identifiers that define the first computer environment 110. For example, in one embodiment of the invention, the authentication system 130 includes a list of identifiers 139 stored in its memory 136 that define the first computer environment 110. In one embodiment, the list of identifiers 139 is a list of known computers operated by a particular institution.

As represented by block 266, the authentication system 130 then determines from the comparison of the identifiers whether the identifier obtained from the second terminal 125 matches any identifier in the list of identifiers stored in its memory 136 as defining the first computer environment 110. As represented by block 268, if there is a match, then the authentication system 130 determines that the second terminal 125 is in the first computer environment 110 and is, therefore, not in the second computer environment 120 since, in this example embodiment, the second computer embodiment 120 is defined as anything outside of the first computer environment 110. However, as represented by block 269, if the second terminal's identifier does not match any identifier in the list, then the authentication system 130 determines that the second terminal 125 is not in the first computer environment 110 and is, therefore, in the second computer environment 120.

FIG. 2C illustrates another process 270 of determining whether the second terminal 125 is within the second computer environment 120, but where the determination is based instead on the communication channel through which the authentication system 130 receives communication from the second terminal 120. FIG. 2C also illustrates an example embodiment where the second computer environment 120 is defined as anything outside of the first computer environment 110.

More particularly, as represented by block 272 in FIG. 2C, the authentication system 130 receives communication from the second terminal 125 via a particular communication channel. As represented by block 274, the authentication system 130 then compares the particular communication channel with a list of known communication channels that define the first computer environment 110. For example, in one embodiment of the invention, the authentication system 130 includes a list of known communication channels 139 stored in its memory 136 that define the first computer environment 110. In one embodiment, the list of communication channels 139 is a list of known computer networks and/or servers operated by a particular institution through which communication can be received by the authentication system 130.

As represented by block 276, the authentication system 130 then determines from the comparison of the communication channels whether the communication channel from which communication with the second terminal 125 was received matches any communication channel stored in its memory 136 as defining the first computer environment 110. As represented by block 278, if there is a match, then the authentication system 130 determines that the second terminal 125 is in the first computer environment 110 and is, therefore, not in the second computer environment 120 since, in this example embodiment, the second computer embodiment 120 is defined as anything outside of the first computer environment 110. However, as represented by block 279, if the particular communication channel does not match any from the list, then the authentication system 130 determines that the second terminal 125 is not in the first computer environment 110 and is, therefore, in the second computer environment 120.

FIG. 2D illustrates yet another process 280 of determining whether the second terminal 125 is within the second computer environment 120, where cookies or other identifiers are associated with the first terminal 115. FIG. 2D also illustrates an example embodiment where the second computer environment 120 is defined as anything other than the first terminal 115 (i.e., anything outside the first computer environment 110 where the first computer environment 110 is defined as the first terminal 115).

More particularly, as represented by block 282 in FIG. 2D, the authentication system 130 places a cookie or other identifier on the first terminal 115 (e.g., stores the cookie or other identifier in the first terminal's memory) during the first portion of the enrollment or setup process performed at the first terminal 115. Then, as represented by block 284, when the user 140 attempts to use the second terminal 125 to complete the enrollment or setup process, the authentication system 130 looks for the cookie or other identifier stored in the second terminal 125.

As represented by blocks 286 and 288, if the authentication system 130 finds the cookie or other identifier in the second terminal 125, then the authentication system 130 determines that the second terminal 125 is, in fact, the first terminal 115 and is, therefore, not in the second computer environment 120 as defined in this example embodiment of the invention. However, as represented by blocks 286 and 289, if the authentication system 130 does not find the cookie or other identifier in the second terminal 125, then the authentication system 130 determines that the second terminal 125 is different from the first terminal 115 and is, therefore, in the second computer environment 120 as defined in this example embodiment of the invention.

In some exemplary embodiments of the invention illustrated in FIGS. 1 and 2A-2D, the authentication system 130 is configured to authenticate users trying to access an online banking system or the online environment of a financial institution and the user 140 is a customer of the bank or financial institution associated with the online banking system or online environment. In some such embodiments, the first terminal 115 is a computer at a bank branch location and the first computer environment 110 is a computer network at the bank branch location or for the bank generally. In some such embodiments, the second terminal 140 is the user's personal computer device and the second computer environment 120 is the Internet generally, but not including the bank branch's computer network or the bank's computer network, as the case may be. For example, FIGS. 3 and 4 illustrate an example of this type of embodiment in greater detail.

More particularly, FIG. 3 is a block diagram illustrating a system and environment 300 for enrolling or setting up a customer in an online financial system and the financial system's authentication engine, in accordance with an embodiment of the present invention. As illustrated, some embodiments of the authentication enrollment system involve authentication of a person or group, such as a customer(s) 314, who is, for example, trying to access or use a customer account maintained by a financial institution.

As used herein, the term "financial institution" refers to an institution that provides financial services for its customers or members by processing financial transactions for its customers or members. Financial institutions can include, but are not limited to, banks, building societies, credit unions, stock brokerages, asset management firms, savings and loans, money lending companies, insurance brokerages, insurance underwriters, dealers in securities, and similar businesses. Retail, wholesale, and service businesses, as well as manufacturers, may also process financial transactions as disclosed herein. The terms "financial transaction," "financial institution," "bank," and any similar terms are used herein in their broadest sense and are intended to encompass all such possibilities unless the context explicitly states otherwise. Although exemplary embodiments of the invention described herein are generally described in terms of financial institutions, other embodiments of the invention can be used for authenticating customers or other persons for any institution.

In the embodiment of the invention illustrated in FIG. 3, the environment 300 for enrolling or setting up a customer 314 in an online financial system and its associated authentication system generally includes a financial institution's computer system 330, an authentication engine 340, an internal or third-party question generator 360, and devices for interacting with a customer through one or more different channels of communication, such as a customer terminal 312, an ATM 309, an Internet server 308, a telephone system 306, and/or an employee terminal 302. Although FIG. 3 illustrates each of these systems as separate and distinct from one another, it will be understood that, in some embodiments, the separation is only conceptual and one or more of these systems are combined with one or more of the other systems. For example, in one embodiment, at least portions of the Internet server 308, employee terminal 302, ATM 309, telephone system 306, network 310, are part of the financial institution's computer system 330. In such embodiments where two or more illustrated systems are combined, the two systems may share at least some system resources, such as processors, communication interfaces, and memory devices. In other embodiments, the systems illustrated in FIG. 3 are actually separate and distinct from one another. Even where the systems are separate, they may, in some embodiments, be controlled by the same institution, such as a financial institution, directly or through an agent, or may, in other embodiments, be controlled by different institutions or other entities. Likewise, it will be apparent by one of ordinary skill in the art in view of this disclosure that, in many cases, some of the procedures described herein as being performed by one system illustrated in FIG. 3 may, in some embodiments, be performed by another system illustrated in FIG. 3.

In general, the customer 314 attempts to access or use an account maintained by the financial institution's computer system 330. For example, a customer 314 may desire to access his or her online banking account and/or the like to obtain information about the account or to make a transaction, such as a purchase, funds transfer, bill payment, withdrawal, deposit, and/or the like. The customer 314 would have to securely enroll in such a system without compromising the unique identifiers provided to him or her by the financial institution.

In general, the customer 314 can use a variety of communication devices and channels to access an account or engage in a transaction involving the account. For example, the customer 314 may use a customer terminal 312, such as a mobile telephone, personal computer, or other computing device, to communicate with the financial institution's computer system 330 via the network 310. The customer 314 may also use other devices and channels, such as an ATM 309, Internet server 308, and/or standard telephone system 306, to communicate with the financial institution's computer system 330 via the network 310. In some instances, the customer 314 calls or meets with an employee 304, such as a customer service representative at a call center or branch location, or other agent of the financial institution, and the employee 304 uses an employee terminal 302, such as a personal computer or computer workstation, to communicate with the financial institution's computer system 330.

Each communication channel generally includes a user interface for interacting with a user, such as the customer 314 or employee 304, in order to, for example: receive requests to access or use an account from the user; provide the user with security questions used for authentication; receive inputs/outputs from the user; and receive answers to the security questions from the user. As used herein, a "user interface" generally includes one or more user input and/or output devices for communicating with a user, such as a display, touch screen, touchpad, keyboard, mouse, joystick, pointing device, keypad, button, speaker, microphone, LED, signature pad, fingerprint device, retinal scan and/or the like. Each communication channel generally also includes a network communication interface configured to communicate with one or more other devices on the network 310.

The network 310 may include any type of network or combination of networks and may, for example, include a global area network (e.g., the Internet), wide area network, local area network, and/or any other direct or indirect wireline or wireless connection between two devices. The network 310 may include one network or a plurality of separate networks and/or connections.

As illustrated in FIG. 3, the financial institution's computer system 330 generally includes a communication interface 332, a memory 336, and a processor 334. The processor 334 is operatively coupled to the communication interface 332 and the memory 336. As used herein, saying that two devices are "operatively coupled" generally indicates that the devices are structured such that they can interact with one another to perform one or more functions. The two devices may or may not be physically coupled to one another.

As used herein, a "communication interface" generally includes hardware and/or software configured to send and/or receive electronic input from other devices, such as other devices on the network 310. For example, a communication interface may include such devices as a server, modem, cable input, cable output, electronic connection, wireless transceiver, and/or the like, as well as any software that allows the device to communicate with other devices on the network 310 using one or more communication protocols. The communication device may also include a user interface having one or more user input and/or output devices for communicating with a user, such as a display, touch screen, touchpad, keyboard, mouse, joystick, pointing device, keypad, speaker, microphone, LED, and/or the like. As used herein, a communication interface may include one device or a number of separate or linked devices.

As used herein, "memory" generally includes computer-readable storage medium for storing computer-executable program code and/or datastores of data and/or databases. For example, memory may include volatile memory, such as volatile Random Access Memory (RAM) including a cache area for the temporary storage of data. Memory may also include non-volatile memory that can be embedded and/or may be removable such as, for example, EEPROM, flash memory, and/or the like. The memory device can store any of a number of pieces of information, instructions, and data used by the system in which the memory exists to implement one or more of the system's functions described herein. As used herein, a memory may include one memory device or a number of separate or linked memory devices.

As used herein, a "processor" generally includes circuitry used for implementing communication and/or logic functions of the system in which the processor resides. For example, a processor may include a digital signal processor device, a microprocessor device, and/or various analog-to-digital converters, digital-to-analog converters, and other support circuits. Control and signal processing functions of the system are allocated between these devices according to their respective capabilities. A processor may include functionality to operate one or more software programs based on computer-executable program code thereof, which may be stored in a memory. As used herein a processor may include one processor device or a number of separate or linked processor devices.

As illustrated in FIG. 3, the authentication engine 340 generally includes a communication interface 342 configured to permit communication with one or more other devices on the network 310, a memory 346 for storing the datastores and/or computer-executable program code of an authentication application 347 that instructs a processor to perform the functions of the authentication engine 340, and a processor 344 operatively coupled to the communication interface 342 and the memory 346, and configured to execute the authentication application 347 stored in the memory 346. As described above, in one embodiment, the authentication engine 340 is integrated into the financial institution's computer system 330 and the separation between the two systems and some or all of its components are merely conceptual. However, in one embodiment, the authentication engine 340 is separate.

As discussed above, a financial institution may not want individuals other than the customer 314 to be able to establish and/or create an online account and create authenticators associated with that account.

FIGS. 4A and 4B provide a flow diagram illustrating a method 400 of a customer 314 enrolling in the financial institution's online financial system 330 and corresponding authentication engine 240, in accordance with an embodiment of the present invention. In this example embodiment of the invention, a customer 314 is attempting to create and gain access to a personal online account with a financial institution.

In the example embodiment of FIGS. 4A and 4B, the customer 314 attempts to create an online account through, for example, a physical banking center or branch, such as an actual location of the financial institution. However, in other embodiments, the customer 314 may enroll using a similar process, and thus, create an account through various channels and networks including an Internet server 308, a telephone system 306, ATM 309, a point-of-sale device, etc. In the illustrated embodiment where the customer is enrolling at a physical location of the financial institution, such as a bank branch or the like, the customer 114 is dealing with an employee 304 of the financial institution.

As illustrated by block 402 in FIG. 4A, the employee 304, either verbally or through inspection, ensures that the customer 314 received account opening documents and has some sort of customer account with the financial institution. As represented by block 404, the employee 304 logs onto the financial institution's computer system 330 over the Internet network 310 at the employee terminal 302 to begin the enrollment or setup process to enroll the customer into the online financial system. Again, the network 310 is not limited to the Internet, and may include other channels.

As the block 406 shows, the employee 304 enters customer identifiers at the employee terminal 302 so that the financial institution's computer system 330 can verify the customer 314. In one embodiment of the invention, the financial institution's computer system 330 presents the identifiers to the authentication engine 340 over the employee terminal 302 and authentication engine's respective communication interfaces so that the authentication engine 340 can check the identifiers against a database of valid or invalid identifiers. For example, the authentication datastore located in memory 346 may include a list of invalid email addresses that the customer's email address is verified against. In this example, the authentication engine's communication interface 342 may return a message indicating success to the financial institution's computer system 330 which would then provide the results at the employee terminal 302 over the network 310. If the customer's identity is validated then, in one embodiment of the process 400, the employee 304 allows the customer 314 to proceed with the enrollment or setup process directly using the employee terminal 302, meaning that the customer 314 would have access to, for example, the employee terminal's keyboard, monitor, and/or any other input and output device.

As with many other enrollment or setup processes, there are various disclosures, agreements, forms, etc., that often need to be reviewed and consented to by the customer. In this example, the employee 304 may provide these terms and conditions to the customer 314 either electronically or in physical form, as represented by block 410. As illustrated by block 412, in one embodiment, the authentication engine 340 requires, during enrollment or setup, that the customer 314 accept the disclosures, agreements, forms, etc., by, for example, consenting via an electronic checkbox, signature, statement, etc., at the employee terminal 302 before proceeding with the enrollment or setup process 400. In the illustrated embodiment, if the customer 314 does not accept the disclosure, an error message is presented on the employee terminal 302 and the enrollment process 400 is halted, as represented by block 413.

If the customer 314 accepts the disclosures, then, as represented by block 414, in some embodiments of the invention the customer's identity is then verified again. Also, in some embodiments, the method 400 includes additional verification steps assuming that the verification steps or requested information were not previously used or the same verification questions were not previously asked to verify identity. These verification steps may include, for example, the authentication engine's communication interface 342 asking for other customer identifiers such as home address, telephone numbers, etc., that the customer would have to answer and comparing the customer's answer against the information found in the customer/account information datastore 338 located in the financial institution's computer system's memory 336 or an external data source such as a jump drive or the like. As represented by block 415, if the customer's identity is not verified, then the authentication engine 340 presents an error message on the employee terminal 302 and the enrollment or setup process 400 is halted.

In the embodiment illustrated in FIG. 4A, once the customer's identity is verified, the authentication engine 340 allows the customer 314 to establish an online identification (e.g., a username or other customer identification code) using the user interface of the employee terminal 302, as represented by block 415. This online identification may have to meet certain standards such as, for example, being unique relative to other customers' online identifications, having at least eight alphanumeric characters with at least two of the characters being numerals, and/or other rules stored in the memory of the authentication engine 340 and/or the financial institution's computer system 330. In one embodiment, the online identification may be created or otherwise chosen by the customer 314. In another embodiment, the online identification may be pre-determined and automatically assigned. As illustrated in FIG. 4A, if the customer 314 creates an online identification that does not comply with the rules, then the process 400 loops back to step 415 and the customer attempts to establish another online identification until one is found that complies with the rules of the authentication engine 340.

Once the authentication engine 340 verifies that the customer's online identification meets the uniqueness requirements and/or other requirements, the customer 314 may proceed to create a personalized website image identification security system, as represented by block 420. An example of a personalized website image identification security system is the SiteKey™ system provided by Bank of America and RSA Data Security. In one embodiment of a website image identification security system such as SiteKey™, the customer 314 identifies himself/herself to the website by entering his/her unique online identification, but not a password. If the customer's unique online identification is valid, the site proceeds to authenticate itself to the customer 314 by displaying a customer-selected image and/or phrase. In one embodiment, this image or phrase is unique to the customer 314. If the customer 314 does not recognize their selected image and/or phrase, he/she aborts the login attempt on the site. Otherwise, if the customer 314 does recognize his/her selected image and accompanying phrase, the site has successfully authenticated itself to the customer 314, and the customer 314 proceeds to enter his/her password/passcode and/or any other log-in information. Accordingly, in this example embodiment, the customer 314 proceeds to create his/her unique image and/or accompanying phrase at the employee terminal 302. In other embodiments of the invention, other authentication systems may be used in the place of a website image identification security system like SiteKey™

As represented by block 422 in FIG. 4B, in some embodiments of the invention, the customer 314 chooses multiple challenge questions and establishes answers for these questions. In one embodiment, these security questions are used for authenticating the site to the user when a website image identification security system is not used or, in some embodiments, when the user is accessing the authentication engine 340 from a particular computer terminal (e.g., in one embodiment, where the computer terminal does not have a particular cookie stored therein from a past visit to the authentication engine 340.

As represented by block 424, the authentication engine 340 then provides a confirmation page on the employee terminal 302, the confirmation page including, for example, a temporary passcode for the customer and the customer's selected website image identification security system information (e.g., selected image, phrase, and/or security questions and answers). In one embodiment, the temporary passcode is randomly generated and may include any combination of alphanumeric characters. As represented by block 426, the customer 314 then returns control of the employee terminal 302 back to the employee 304.

As represented by block 430, the employee 304 may also launch an application to assist the customer in learning how to use the online account. The launched application may be part of the authentication application 347 stored in the authentication engine's memory 340 and may be provided to the customer 314 at the employee terminal 302. In some embodiments, the demonstration may also include the employee 304 assisting the customer 314 to set up the customer's online account experience, as represented by block 432. As represented by block 434, the portion of the enrollment or setup process performed with the customer 314 at the financial institution is completed and the user 314 leaves the financial institution's physical location.

However, although the customer 314 has completed the portion of his/her enrollment or setup within the financial institution, the customer 314 must still change the temporary passcode that was provided to the user by the authentication system in the process step represented by block 424. To do so, the illustrated embodiment of the invention requires the customer 314 to leave the financial institution's computer system 330 (of which the employee terminal 302 was a portion thereof) and complete the enrollment or setup process and establish a more-permanent passcode from a customer terminal 312 that is located outside of the financial institution's computer system 330. In this embodiment, the temporary passcode that was provided to the customer 314 by the authentication engine 340 in step 424 may be a passcode that is valid only a predetermined limited number of days or uses outside of the financial institution's computer system 330 (e.g., one, two, or three uses). For example, the temporary passcode may be set-up to be valid for thirty days and/or for only one use outside of the financial institution's computer system 330. In some embodiments, the authentication engine 340 will not authenticate the customer 314 if the customer 314 is using the employee terminal 302 or other computer devices in the financial institution's computer system 330 and has not yet changed the temporary passcode.

More particularly, FIGS. 4B and 5 show flow diagrams for this second stage of a customer's enrollment where the customer completes enrollment from a customer terminal 312 located outside of the financial institution's computer system 330, in accordance with one embodiment of the invention. Referring to FIG. 4B, the customer 314 returns home or otherwise leaves the financial institution's computer system and uses a personal computing device or other computer terminal located outside of the financial institution's system to access the financial institution's online computer system. For example, in one embodiment of the invention, as represented by block 436, the customer 314 accesses the online computer system over the Internet 310 from his/her customer terminal 312, such as a home computing or mobile device, and enters his/her unique online identification established during the first portion of the enrollment process. At this point, the authentication engine's processor 344 may extract information from the customer terminal 312 such as, for example, its IP address, the date it last visited the website, cookies, communication channel information, etc.

In this example, the authentication engine's processor 344 may allow the authentication engine 340 to review the customer terminal's cookies to determine if it contains one for the website image identification security system. In another embodiment, the authentication engine's processor 344 allows the authentication engine 340 to review the customer terminal's IP address, date last visited, and/or the like, and determine that it is not an IP address that it recognizes or has seen, and that it is not an IP address from within the financial institution's computer system 330. In this way, some embodiments of the present invention ensure that a customer 314 is outside of the financial institution's computer system 130 before he/she can create a permanent passcode and have full access rights to the customer account and/or by having the customer complete different portions of the full authentication enrollment process from two different locations.

In the illustrated embodiment of FIG. 4B, since the customer terminal 312 does not contain a website image identification security system cookie, the authentication engine's processor 344, through its communication interface 342, provides the website image identification security system challenge questions to the customer terminal 312, as represented by block 438. As represented by block 440, the customer 314 is then asked to input answers at the customer terminal 112 which are then verified by the authentication engine's processor 344. If the questions are not answered correctly, the customer 314 may be locked out after any number of attempts (e.g., three attempts), as represented by block 442.

If the customer 314 answers the challenge questions correctly, then, in this embodiment, the authentication engine's processor 344 may invoke the website image identification security system and display the unique customer image and accompanying phrase at the customer terminal 312, as represented by block 444. If the customer 314 recognizes his/her unique image and accompanying phrase, he/she may then enter his/her temporary passcode provided during step 424 of enrollment or setup process completed earlier in the financial institution's system. As represented by blocks 446 and 448, if the customer 314 provides the wrong passcode, he/she may be locked out of the authentication process after any number of attempts (e.g., five attempts).

If the customer 314 successfully enters his/her correct temporary passcode, the customer 314 may be required to pass a further enrollment authentication threshold in order to receive a permanent passcode, as represented by block 450. Once the customer 314 establishes a permanent passcode, the customer 314 is permitted to access the online environment and is now fully enrolled or set up in the authentication system.

FIG. 5 is a flow diagram illustrating another exemplary process of completing enrollment into an online environment, in accordance with an embodiment of the present invention. In this example embodiment of the invention, the customer 314 signs in for the first time from a customer terminal 312 after completing the first portion of the enrollment process at an earlier time from an employee terminal 302, as represented by block 500. The customer 314 then inputs the customer's online identification, such as a unique username, account number, ID, or the like, as represented by block 505.

The authentication engine 340 then determines whether the customer 314 has already been set up on an authentication system, as represented by block 510. If not, then the authentication engine 340 goes through the necessary process with the customer 314 to set up an authentication system. If the authentication system is already set up, then the authentication engine 340 looks for the authentication system cookie in the customer terminal's memory. If the cookie is not found, then the customer 314 is asked to answer one or more challenge questions 525 that were established by the user during set up of the authentication system. If the authentication engine 340 does identify the cookie in the customer terminal or the customer 314 answers the challenge questions correctly, then the customer 314 is presented with the customer-selected image, as represented by block 530, and asked to input the temporary passcode that the customer 314 received within the financial institution, as represented by block 535.

In the illustrated embodiment, the authentication engine 340 then determines whether the customer 314 is eligible for out-of-wallet questions, as represented by block 540. Out-of-wallet questions are generally questions where the answers to the questions are not available on a debit or credit card or something else carried by a customer 314, thus making them difficult for anyone besides the customer 314 to answer. Some embodiments use static and semi-static out-of-wallet questions. An example of a static question is: "What is your birthday?" The answer to this question will always remain the same. An example of a semi-static question is: "What is your address?" The answer to this question can change, but remains the same for typically long periods of time.

Some embodiments may also use dynamic out-of-wallet questions. For example, in some embodiments, where available, the authentication engine 340, may, through the financial institution's computer system 330, use its own information or external information located in the customer/account information datastore 338 about a customer 314 or a customer account to generate dynamic out-of-wallet questions. For example, in one embodiment where the institution is a financial institution that has access to information about a customer 314, some of the questions may ask about recent account activity, such as the amount of a recent transaction, the retailer or product involved in the recent transaction, the location of a recent transaction, the date of a recent transaction, and/or the like, or about recent customer behaviors associated with the account, such as the customer's preferred retailer, ATM, bank branch, product, brand, activity, and/or the like. In some embodiments, for example, in cases where the institution may not have the information available to generate enough out-of-wallet questions, some embodiments of the invention may then contact a third-party 360, such as a credit reporting agency or other institution, to obtain out-of-wallet questions and/or information that can be used to generate out-of-wallet questions.

In the illustrated embodiment of the invention, if the authentication engine 340 determines that the customer 314 is eligible for out-of-wallet questions, it presents them to the customer 314 via the communication interface 342 at the customer terminal 312. Again, it may, for example, generate out-of-wallet questions from information found within the financial institution's customer/account information datastore 338 or it may receive questions from a third-party question generator 360. The customer 314 may be required to correctly answer any number of out-of-wallet questions (e.g., two out of three out-of-wallet questions), as represented by block 545.

In the illustrated embodiment, if the customer 314 does not correctly answer the requisite number of out-of-wallet questions, if the authentication engine 340 determines that the customer 314 is not eligible for out-of-wallet questions, or if the authentication engine 340 bypasses out-of-wallet questions, then the authentication engine 340 provides an authorization number page to the customer 314 at the customer terminal 312, as represented by block 550. The authorization number page informs the customer 314 that a randomly-generated authorization number is being sent to the customer's email address on record. In other embodiments of the invention, however, the authentication engine 340 may lockout the customer 314 after a number of unsuccessful attempts to enter the authorization number.

In the illustrated embodiment, the customer 314 then logs into his/her email account and obtains the authorization number, as represented by block 580. The customer 314 then inputs the number at the enrollment screen displayed at the customer terminal 312, as represented by block 565. Furthermore, if the authentication engine 340 determines that the customer 314 initiated enrollment at a banking center, it may again request consent to the various forms, agreements, disclosures, contracts, etc., that the customer previously consented to, in order to receive additional verification.

As represented by block 570, once the customer 314 either answers the out-of-wallet questions and/or enters the authorization number, as the case may be, the customer 314 is then asked to input a permanent passcode to replace the temporary passcode provided to the customer 314 when the customer was within the financial institution's system. At this stage, the enrollment is complete and the customer 314 has full access rights to his/her online account and has established all IDs and passwords needed to be authenticated by the authentication engine 340 going forward, as represented by block 575.

Additional features of this embodiment may include extra security layers that may be implemented in order to deter fraud. For example, in some embodiments, as discussed above, the temporary passcode can only be changed to a permanent passcode from a customer terminal 312 excluded from certain IP addresses or locations. For example, if the financial institution wishes to prevent IP addresses from within its computer system 330 from being able to change temporary passcodes to permanent passcodes, it may place these IP addresses in a rules datastore 339 that the authentication engine 340 would verify before allowing the passcode to be changed. Further, in some embodiments, the system can prevent the customer 314 from changing the email address associated with his/her account from certain IP addresses or locations when there is only a temporary passcode associated with it. For example, the financial institution may prevent customers or other persons using IP addresses from within its computer system from being able to change email addresses associated with an account still having a temporary passcode associated with the account.

In some embodiments, the entire enrollment authentication process may be web-based. For example, as shown above, the employee 304 may walk a customer 314 through the entire enrollment process from the employee terminal. In another embodiment, the customer 314 may be able to begin and complete the entire enrollment authentication process by visiting the financial institution's website from his/her customer terminal 312 or kiosk.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate in view of this disclosure that various adaptations and modifications of the just described embodiments can be configured without departing from the scope and spirit of the invention. Therefore, it is to be understood that, within the scope of the appended claims, the invention may be practiced other than as specifically described herein. For example, unless expressly stated otherwise, the steps of processes described herein may be performed in orders different from those described herein and one or more steps may be combined, split, or performed simultaneously. Those skilled in the art will appreciate, in view of this disclosure, that different embodiments of the invention described herein may be combined to form other embodiments of the invention.

What is claimed is:

1. An apparatus comprising:
a communication interface configured to receive a request from a computing terminal to continue an enrollment process;
a memory having information stored therein defining a computer environment, wherein the information stored in the memory comprises a list of identifiers; and
a computer processor operatively coupled to the communication interface and the memory, wherein the computer processor is configured to:
receive an identifier associated with the computing terminal, and
determine whether the computing terminal is within the computer environment by comparing the identifier associated with the computing terminal to the list of identifiers stored in the memory; and
permit or deny the request from the computing terminal to continue the enrollment process based at least partially on whether the computing terminal is within the computer environment.

2. The apparatus of claim 1, wherein the computer processor is configured to deny the request to continue the enrollment process if the computing terminal is within the computer environment.

3. The apparatus of claim 1, wherein the identifier comprises an Internet Protocol (IP) address.

4. The apparatus of claim 1, wherein the list of identifiers stored in the memory comprises a list of communication channels, wherein the computer processor is configured to:
determine an identity of a communication channel through which the request from the computing terminal is received; and
determine whether the computing terminal is within the computer environment by comparing the identity of the communication channel to the list of communication channels stored in the memory.

5. The apparatus of claim 1, wherein the communication interface is configured to communicate with a first computing terminal to perform a first portion of the enrollment process, wherein the first terminal exists in a first computer environment, and wherein the information stored in the memory defining a computer environment defines the first computer environment.

6. The apparatus of claim 5, wherein the computer processor is configured to deny the request to continue the enrollment process if the computing terminal is within the first computer environment.

7. The apparatus of claim 5, wherein the first portion of the enrollment process comprises establishing a temporary password for a user, and wherein the request to continue the enrollment process comprises a request to establish a permanent password.

8. The apparatus of claim 5, wherein the enrollment process comprises establishing one or more authenticators to be used to authenticate a user, wherein the first portion of the enrollment process comprises establishing a first authenticator, and wherein the request to continue the enrollment process comprises a request to change the first authenticator or establish a second authenticator.

9. The apparatus of claim 1, wherein the communication interface is configured to communicate with a first computing terminal to perform a first portion of the enrollment process, and wherein the computer processor is configured to determine whether the computing terminal is within the computer environment based at least partially on a determination of whether the computing terminal is the first terminal.

10. The apparatus of claim 9, wherein the computer processor is configured to deny the request to continue the enrollment process if the computing terminal comprises the first computing terminal.

11. The apparatus of claim 1, wherein the enrollment process comprises enrolling in an online system associated with an institution, wherein the computer environment comprises a computer system associated with the institution, wherein a portion of the enrollment process is completed from within the computer system associated with the institution, and wherein the computer processor is configured to deny the request to continue the enrollment process if the computing terminal is within the computer system associated with the institution.

12. A method of establishing authenticators for an authentication system, the method comprising:

establishing an authenticator for a user based on communication received through a first computer environment;

receiving a request from a computing terminal to change the authenticator or create a new authenticator, wherein the request comprise an identifier;

using a computer processor to determine if the computing terminal is within the first computer environment, wherein by comparing the identifier associated with the computing terminal to a list of identifiers stored in a memory; and hindering the request to change the authenticator or create a new authenticator if the processor determines that the computing terminal is within the first computer environment.

13. The method of claim 12, further comprising:

determining that the computing terminal is within the first computer environment if the identifier received from the computing terminal matches an identifier on the list of one or more identifiers.

14. The method of claim 12, wherein the list of identifiers stored in the memory comprises a list of communication channels identifying a communication channel through which the request from the computing terminal is received; and determining that the computing terminal is within the first computer environment if the identified communication channel matches a communication channel on the list of identifiers.

15. The method of claim 12, wherein establishing the authenticator for the user based on communication received through the first computer environment comprises establishing a temporary passcode.

16. The method of claim 12, wherein the authentication system is configured to authenticate a user accessing an online system associated with an institution, and wherein the first computer environment comprises a computer system associated with the institution.

17. An apparatus comprising:

a memory having information stored therein defining a computer environment, wherein the information stored in the memory comprises a list of identifiers;

a communication interface configured to receive a first communication from a first computer environment and a second communication from a computing terminal in a second computer environment, wherein the first communication comprises information used for completing a first portion of an enrollment process, and wherein the second communication comprises a request to complete a second portion of the enrollment process; and a processor operatively coupled to the communication interface and configured to:

determine whether the second computer environment is different than the first computer environment by receiving an identifier from the computing terminal, and determining whether the computing terminal is within the second computer environment by comparing the identifier received from the computing terminal to the list of identifiers stored in the memory; and use the communication interface to communicate with the computing terminal to complete the second portion of the enrollment process if the processor determines that the second computer environment is different than the first computer environment.

18. An authentication system comprising:

a communication interface configured to receive a request from computing terminals to perform an enrollment process;

a memory having information stored therein defining a computer environment, wherein the information stored in the memory comprises a list of identifiers; and a computer processor operatively coupled to the communication interface and the memory, wherein the processor is configured to:

use the communication interface to provide a temporary passcode to a first computing terminal in a computer environment;

receive from a second computing terminal an electronic communication comprising a request to create a permanent passcode to replace the temporary passcode;

determine whether the second computing terminal is within the computer environment by comparing an identifier received from the second computing terminal to the list of identifiers stored in the memory; and permit creation of the permanent passcode via the second computing terminal if the second computing terminal is not within the computer environment.

19. The authentication system of claim 18, wherein the communication interface provides the temporary passcode using at least a portion of the defined computer environment.

20. The authentication system of claim 18, wherein the computer environment defines a first location, and wherein the computer processor permits the creation of a permanent passcode if the second computing terminal is at a location different from the first location.

21. A method for enrollment in an authentication system, the method comprising:

receiving customer enrollment information for creating an online account from a first computing terminal in a first computer environment;

providing a customer identification name and temporary passcode for creating the online account;

receiving an electronic communication from a second computing terminal comprising a request to complete creation of an online account using the customer identification name and temporary passcode, wherein the request comprise an identifier;

using a computer to determine whether or not the second computing terminal is within the first computer environment, wherein the second computing terminal is within the first computer environment if the identifier received from the second computing terminal matches an identifier from a list of one or more identifiers; and providing a permanent passcode to the second computing terminal for the online account if the second computing terminal is not in the first computer environment.

22. The method of claim 21 wherein receiving customer enrollment information for creating the online account comprises verifying the customer enrollment information.

23. The method of claim 21 wherein the temporary passcode is configured to expire after a predefined number of uses.

24. The method of claim 21 wherein the temporary passcode is configured to expire after a predefined number of days.

25. The method of claim 21 further comprising authenticating the customer using the customer identification name and the permanent passcode.

26. The method of claim 25, wherein authenticating the customer comprises providing out-of-wallet questions to authenticate the customer.

27. The method of claim 25, wherein authenticating the customer comprises using a website image identification security system to authenticate the customer.

28. The method of claim 25, wherein authenticating the customer further comprises:
sending an authorization code to the customer's account; and
receiving the customer's input of the authorization code.

29. The method of claim 21, wherein the identifier received from the second computing terminal comprises an IP address.

30. The method of claim 21, wherein the identifier received from the second computing terminal comprises a telephone area code, an ATM address, a zip code, a physical address, or a geocode.

* * * * *